US012505395B2

(12) United States Patent
Wheatley et al.

(10) Patent No.: US 12,505,395 B2
(45) Date of Patent: Dec. 23, 2025

(54) SYSTEM TO INFER LONGEVITY OF CLOUD COMPUTING RESOURCE USAGE AND RANK IN ORDER OF IMPORTANCE

(71) Applicant: Kyndryl, Inc., New York, NY (US)

(72) Inventors: Keri Wheatley, Sevierville, TN (US); Mouleswara Reddy Chintakunta, Allagadda (IN); Omar Odibat, Cedar Park, TX (US)

(73) Assignee: Kyndryl, Inc., New York, NY (US)

( * ) Notice: Subject to any disclaimer, the term of this patent is extended or adjusted under 35 U.S.C. 154(b) by 257 days.

(21) Appl. No.: 18/455,435

(22) Filed: Aug. 24, 2023

(65) Prior Publication Data
US 2025/0069003 A1 Feb. 27, 2025

(51) Int. Cl.
G06Q 10/00 (2023.01)
G06Q 10/0631 (2023.01)
(52) U.S. Cl.
CPC .............. G06Q 10/06315 (2013.01)
(58) Field of Classification Search
None
See application file for complete search history.

(56) References Cited

U.S. PATENT DOCUMENTS

| | | | | |
|---|---|---|---|---|
| 7,120,680 | B1* | 10/2006 | Higgins | H04L 41/12 709/230 |
| 2008/0255693 | A1* | 10/2008 | Chaar | G06Q 10/00 700/97 |
| 2009/0063445 | A1* | 3/2009 | Arimilli | H04L 45/22 707/999.005 |
| 2011/0213875 | A1* | 9/2011 | Ferris | G06F 9/5072 709/224 |
| 2013/0018868 | A1* | 1/2013 | Chi | G06F 16/93 707/E17.014 |
| 2015/0363739 | A1* | 12/2015 | Aparimit | G06Q 10/063118 705/7.17 |
| 2016/0226955 | A1 | 8/2016 | Moorthi | |
| 2017/0188101 | A1* | 6/2017 | Srinivasaraghavan | H04L 67/30 |
| 2018/0069885 | A1* | 3/2018 | Patterson | G06F 16/27 |
| 2019/0013943 | A1* | 1/2019 | Maim | H04L 9/30 |
| 2019/0102462 | A1* | 4/2019 | Botea | H04L 67/306 |
| 2019/0171438 | A1* | 6/2019 | Franchitti | G06N 3/08 |

(Continued)

OTHER PUBLICATIONS

J Krzywda et al. (Extended Optimization Model)—oparu.uni-ulm.de Delivery date: Sep. 30, 2015. (Year: 2015).*

(Continued)

Primary Examiner — Hafiz A Kassim
(74) Attorney, Agent, or Firm — CANTOR COLBURN LLP; Erik Swanson

(57) ABSTRACT

An approach is disclosed that creates a network graph that identifies computing resources as nodes. Each of the computing resources is weighted based upon the corresponding resource's attributes and usage. The approach connects a first set of nodes as directly connected and a second set of nodes as indirectly connected. Node longevity values are calculated for each node in the network graph with each of the node longevity values corresponding to one of the nodes in the network graph. The calculations are based on the direct and indirect connections between each of the nodes. The computing resources are managed based on the corresponding node longevity values.

20 Claims, 9 Drawing Sheets

(56) References Cited

U.S. PATENT DOCUMENTS

| | | | |
|---|---|---|---|
| 2019/0317788 A1* | 10/2019 | Lang | G06F 9/5077 |
| 2020/0012733 A1* | 1/2020 | Ding | G06F 16/2264 |
| 2021/0026687 A1 | 1/2021 | Miller | |
| 2022/0300337 A1 | 9/2022 | Batra | |
| 2023/0022673 A1* | 1/2023 | Derzsy | G06N 5/022 |
| 2023/0140115 A1* | 5/2023 | Vasseur | H04L 45/50 |
| | | | 709/238 |
| 2024/0143968 A1* | 5/2024 | Kishore | G06F 9/5077 |
| 2024/0249220 A1* | 7/2024 | Odibat | G06Q 10/06313 |
| 2025/0007794 A1* | 1/2025 | Pyle | G06Q 10/063 |

OTHER PUBLICATIONS

A Muresan et al. (Scheduling and deployment of large-scale applications on Cloud platforms)—2012—theses.hal.science (Year: 2012).*

GK Bipinchandra, P Aluvalu, DAS Singh et al. (Intelligent Resource Allocation Technique For Desktop-as-a-Service in Cloud Environment)—arXiv preprint arXiv . . . , 2014—arxiv.org (Year: 2014).*

Disclosed Anonymously, "Method to Create and Utilize a Sizing Model for Chatbot Deployments on Cloud Environments with a Continuous Cycle to Cost Optimize Cloud Resources Instance Types and Pricing Models," IP.com, IPCOM000262979D, Jul. 17, 2020, 12 pages.

Disclosed Anonymously, "Using Model Simulation, Optimization, and Profiling to Generate and Forecast Cloud Infrastructure Cost Savings," IP.com, IPCOM000271857D, Feb. 17, 2023, 6 pages.

Singh et al., "Node-weighted centrality: a new way of centrality hybridization," Computational Social Networks, Springer Open, 2020, 33 pages.

"Getting Started with VMware Aria Automation for Secure Clouds," CloudHealth Secure State, VMWare, Mar. 2023, 115 pages.

\* cited by examiner

SYSTEM TO INFER LONGEVITY OF CLOUD COMPUTING RESOURCE USAGE AND RANK IN ORDER OF IMPORTANCE

BACKGROUND

Cloud computing is on-demand access, via the internet, to computing resources—applications, servers (physical servers and virtual servers), data storage, development tools, networking capabilities, and more—hosted at a remote data center managed by a cloud services provider (or CSP). The CSP makes these resources available for a monthly subscription fee or bills them according to usage. Compared to traditional on-premises IT, and depending on the cloud services you select, cloud computing helps lower IT costs, improve agility and time-to-value, and scale more easily and cost-effectively: Cloud allows customers to offload some or most of the costs and effort of purchasing, installing, configuring, and managing their own on-premises infrastructure. Cloud computing also improves agility and time-to-value as with cloud, an organization can start using enterprise applications in minutes, instead of waiting weeks or months for IT to respond to a request, purchase and configure supporting hardware, and install software. Cloud also empowers certain users—specifically developers and data scientists—to help themselves to software and support infrastructure. Cloud scales more easily and cost-effectively. It provides elasticity, instead of purchasing excess capacity that sits unused during slow periods, an organization can scale capacity up and down in response to spikes and dips in traffic. An organization can also take advantage of its cloud provider's global network to spread their applications closer to users around the world. The term 'cloud computing' also refers to the technology that makes cloud work. This includes some form of virtualized IT infrastructure—servers, operating system software, networking, and other infrastructure that is abstracted, using special software. In this manner, cloud computing, can be pooled and divided irrespective of physical hardware boundaries. For example, a single hardware server can be divided into multiple virtual servers.

SUMMARY

An approach is disclosed that creates a network graph that identifies computing resources as nodes. Each of the computing resources is weighted based upon the corresponding resource's attributes and usage. The approach connects a first set of nodes as directly connected and a second set of nodes as indirectly connected. Node longevity values are calculated for each node in the network graph with each of the node longevity values corresponding to one of the nodes in the network graph. The calculations are based on the direct and indirect connections between each of the nodes. The computing resources are managed based on the corresponding node longevity values.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
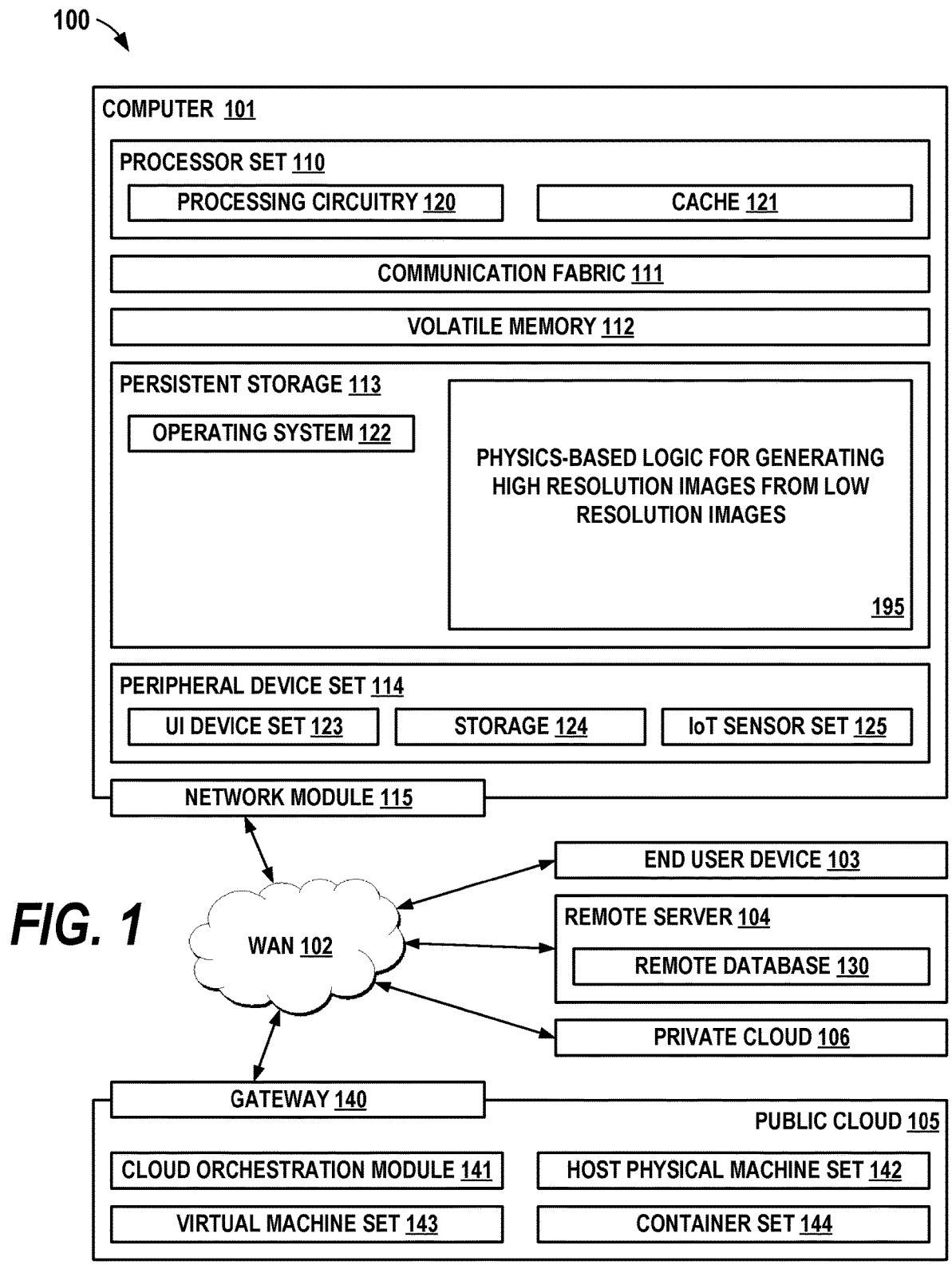
FIG. 1 is a block diagram of a data processing system in which the methods described herein can be implemented.

FIGS. 1-9 describe an approach that uses artificial intelligence (AI) to generate resource longevity ("importance") scores and usage forecast for organizational resources. The resource longevity scores and usage forecasts are used for various downstream uses, discussed below in greater detail. Based on organizational (user) inputs, the approach ranks organizational resources from most to least longevity. The approach graphs the organization's resources in a network graph. As used herein, nodes in the graph symbolize the resources and the primary edges indicate the direct connections between resources. Each node is given a weight to denote "importance" based on resource attributes. In one embodiment, an AI-based regression model is utilized to determine the node weights. The model utilizes various inputs corresponding to each resource to determine the importance of that node. These inputs can include storage usage, age, costs, read/write history, and the like. The inputs can change frequently and outputs are updated based on that feedback. The network graph includes secondary edges representing indirect relationships that are used to connect disconnected subgraphs. A "longevity ranking" is calculated for each resource using a centrality measure called node-weighted harmonic centrality with secondary edges.

Next, the approach forecasts the monthly usage for each organizational resource. In one embodiment, a classification is calculated for each resource, such as "short term," "1-year," "3-year," etc. In one embodiment, an AI-based classification model called a Resource Util Predictor is used to classify each resource. This AI model takes the resource attributes as inputs and the trained model provides a classification prediction (e.g., short-term, medium-term, long-term, etc.). The approach further dynamically forecasts the monthly usage for each resource type. In one embodiment, another AI-model, called a Resource Longevity Forecaster, takes the outputs from the Resource Util Predictor model and the historical usage data for the resource to forecast the total usage throughout the resources' predicted longevity (e.g., months, one year, several years, etc.).

In one embodiment, the approach improves the process of cloud migrations. During a cloud migration, resources are moved in phases and some are destroyed permanently not to be moved at all. This approach specifies the importance of resources and their longevity, thereby, creating accurate cloud migration phases targeting the correct resources. One of the goals of cloud migrations is to decrease overall cloud computing costs. The usage forecaster aids in the design of a cloud migration by accurately predicting the costs of the current and future systems. The resource longevity (importance) scores and usage forecasts for organizational resources are used as inputs for various downstream uses described in further detail below.

In one embodiment, the approach improves the process of resource maintenance. Resource maintenance, such as performing system upgrades, software updates, security checks, etc., is a costly process. This approach improves this process by allocating maintenance resources to the most important resources in the cloud computing system. Not all maintenance activities are required for every resource. The usage forecaster segregates resources into short and long-term usage which allows the right amount of resource maintenance to be performed for each resource's needs. In one embodiment, the resource maintenance forecaster is an AI-model that takes the discussed above and outputs, from the trained AI-model, the resource maintenance forecast.

In one embodiment, the approach improves cloud computing recommendations. Cloud Computing Insights is a large industry with many competitors. Some recommendation types include rightsizing, shutdown, scheduling, and security. This approach improves those recommendations. By determining short-and long-term resources and providing the correct recommendations (rightsizing, security updates, etc.) based on the resource's future longevity. The approach also provides the forecasts to predict when to shutdown a resource and the correct scheduling pattern that should be implemented. In one embodiment, the cloud migration usage forecaster is an AI-model that takes the discussed above and outputs, from the trained AI-model, a cloud migration usage forecast.

In one embodiment, the approach provides valuable inputs into Maturity Assessment. Maturity Assessments are a Financial Operations ("FinOps") standard used to understand a customer's cloud computing behaviors. The approach infers the longevity of the customer's resources. Understanding the longevity of resources is an input for the maturity assessment. This approach determines how resources are being used by an organization, whether in advanced ways or remedial ways. This approach also determines and understands the complexity of the networks of resources that the organization has created. The usage forecaster provides an input for the maturity assessment by determining the current and future usage patterns of an organization, such as increasing, decreasing, or stable usage patterns. This also identifies a list of short-and long-term resources of the organization. In one embodiment, the maturity assessment forecaster is an AI-model that takes the discussed above and outputs, from the trained AI-model, a maturity assessment forecast.

In one embodiment, the approach gives the user an option to select a certain percentage of coverage of discount plans for the resources in their ecosystem. This gives the user the option of testing various discount plans, for example by allowing the user to select 0-100% coverage as possible options. Here, the approach ranks resources from most to least likely to benefit from a particular discount plan. In one embodiment, the approach drops a resource that is deemed to be short-term only. The approach then forecasts the future usage of resources in the ecosystem. In this embodiment, the final output is a recommendation of the amount of discount plan to recommend that the user buy, exchange, or refund, a list of the resources that will use the plans, and their predicted future usage. In one embodiment, the discount plan recommender is an AI-model that takes the discussed above and outputs, from the trained AI-model, a recommended discount plan along with coverage levels.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
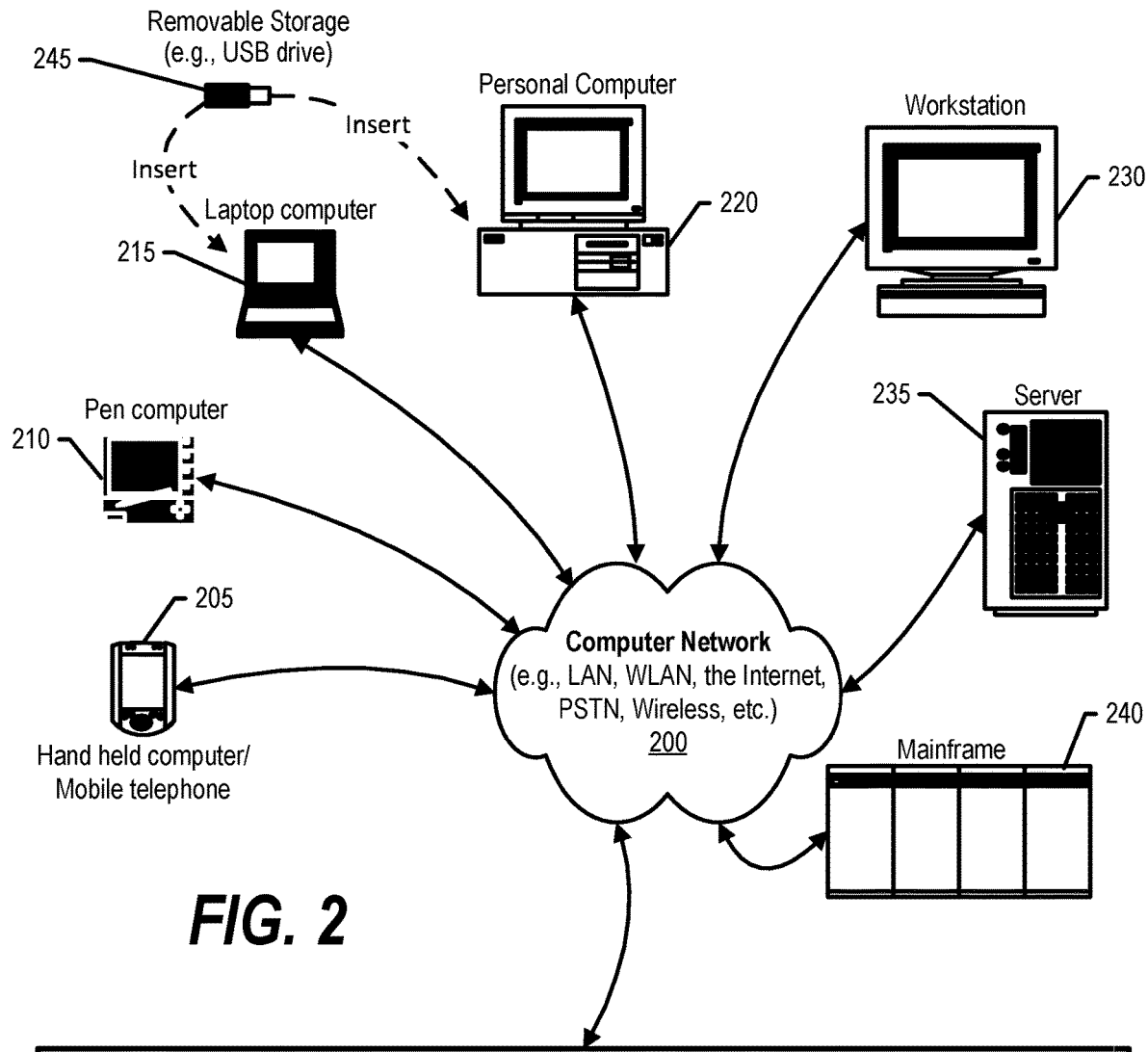
FIG. 2 provides an extension of the information handling system environment shown in FIG. 1 to illustrate that the methods described herein can be performed on a wide variety of information handling systems which operate in a networked environment.
Figure 2:
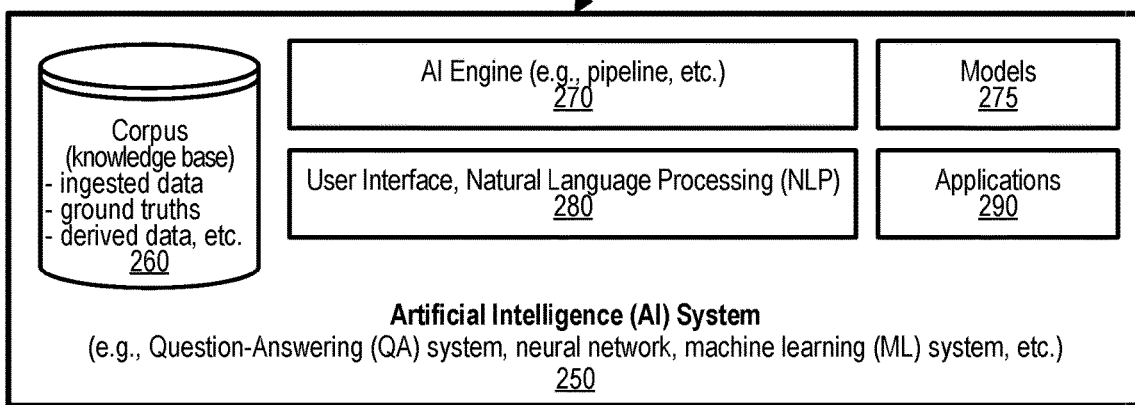

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include nonvolatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (Uis) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
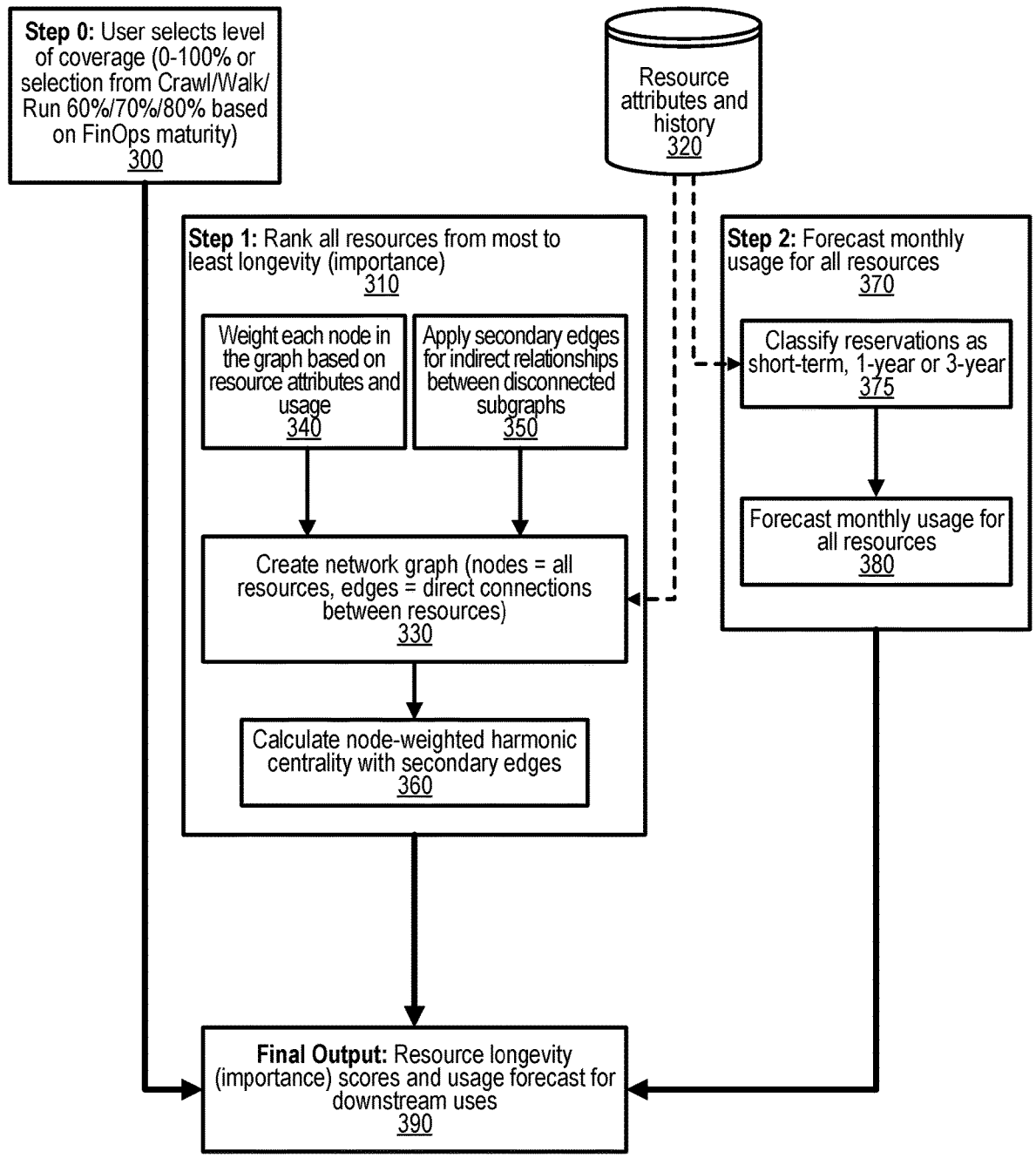
FIG. 3 is a diagram overall steps to infer longevity of cloud computing resource usage and rank in order of importance and forecast resource monthly usage.

FIG. 3 is a diagram overall steps to infer longevity of cloud computing resource usage and rank in order of importance and forecast resource monthly usage. At step 300, the process has the user select the level of coverage (e.g., 0-100% or selection from Crawl/Walk/Run 60%/70%/80% based on FinOps maturity, etc.). This step is noted as "step 0" as the input is used by the first computerized step, noted as "step 1 (310).

At step 310 (aka "step 1"), the process ranks all of the resources from the most to the least in terms of longevity (importance). This step has an AI-based regression model to determine the node weights. The model takes in various inputs about a resource (ex. storage usage, age, cost spend, read/write history, etc.) in order to determine the importance of that node. Inputs change frequently and outputs are updated based on that feedback. This step (step 1) is comprised of a number of sub-steps, noted as steps 330 through 360. At step 330, the process creates a network graph where nodes represent the resources and the edges represent connections between resources. The individual resource attributes and history are retrieved from data store 320. At step 340, the process weights each node in the graph based on the resource attributes and usage. At step 350, the process applies secondary edges to nodes representing indirect relationships between disconnected subgraphs. The creation of the network graph at step 330 uses the weights and edges from steps 340 and 350. At step 360, the process calculates the node-weighted harmonic centrality with secondary edges (see FIG. 9 formula 900 for an example embodiment of a centrality formula used to calculate node values).

At step 370 (aka "step 2"), the process forecasts monthly usage for all resources by performing sub-steps 375 and 380. At step 375, the process classifies the reservations (e.g., as short-term, 1-year or 3-year, etc.). This step retrieves resource attributes and history data from data store 320 to perform the classifications. In one embodiment, this is an AI-based classification model that takes resources attributes to and predicts the classification of the resource into short-term, mid-term, or long-term resources. At step 380, the process forecasts the monthly usage for all resources based on the classifications that were determined at step 375. In one embodiment, this is an AI-based forecasting model that takes the outputs from the step 375 and the historical usage data to forecast the total usage throughout one or many years.

At step 390, the process computes the final output which is the resource longevity (importance) scores and usage forecast for each resource with the final output now being available for downstream uses, such as those depicted in FIGS. 4-7. In one embodiment, this is an AI-based model that predicts the type of discount plan required along with coverage levels.

Figure 4:
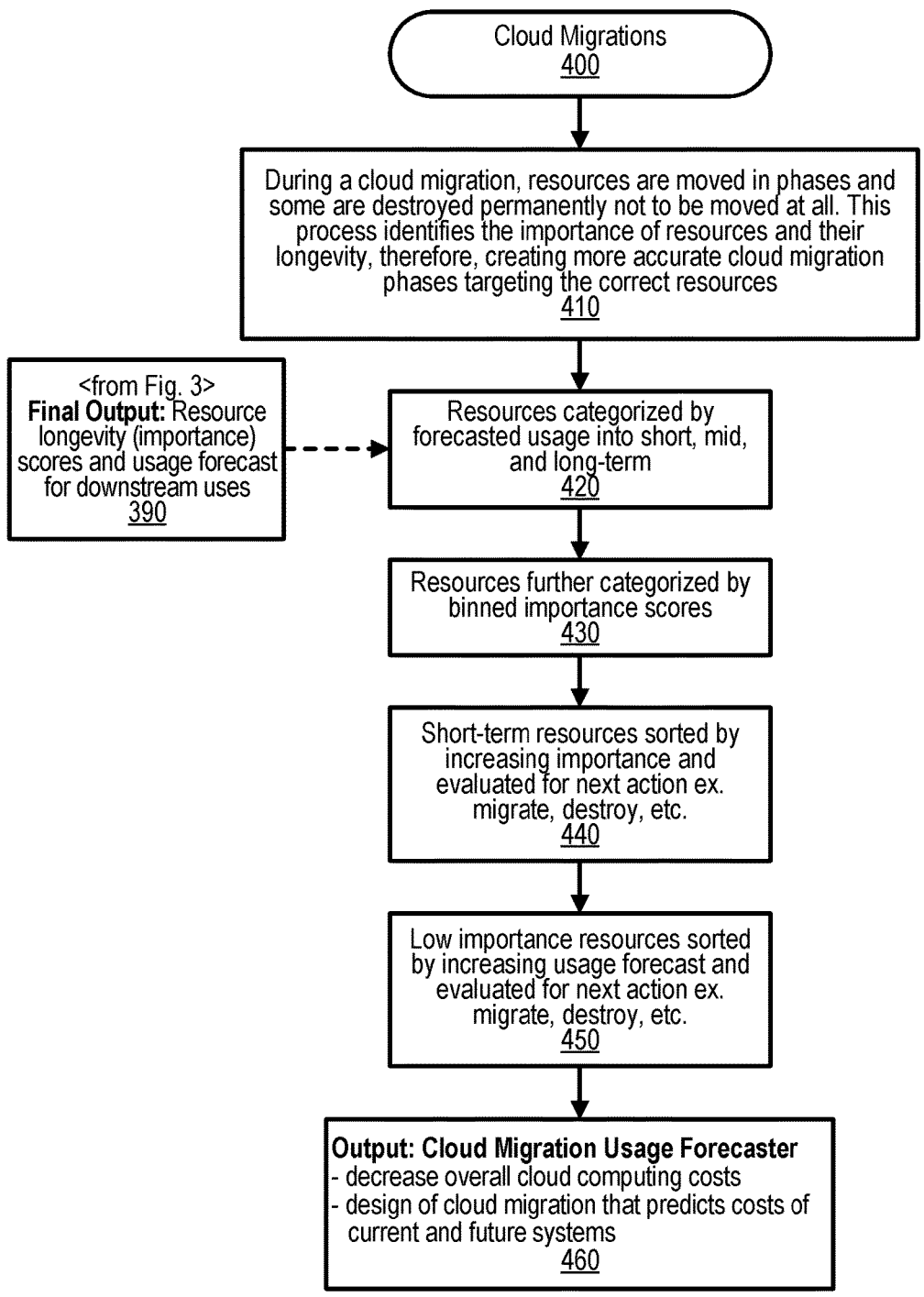
FIG. 4 is a flowchart depicting using resource longevity computed by FIG. 3 to generate a cloud migration usage forecast.
Figure 5:
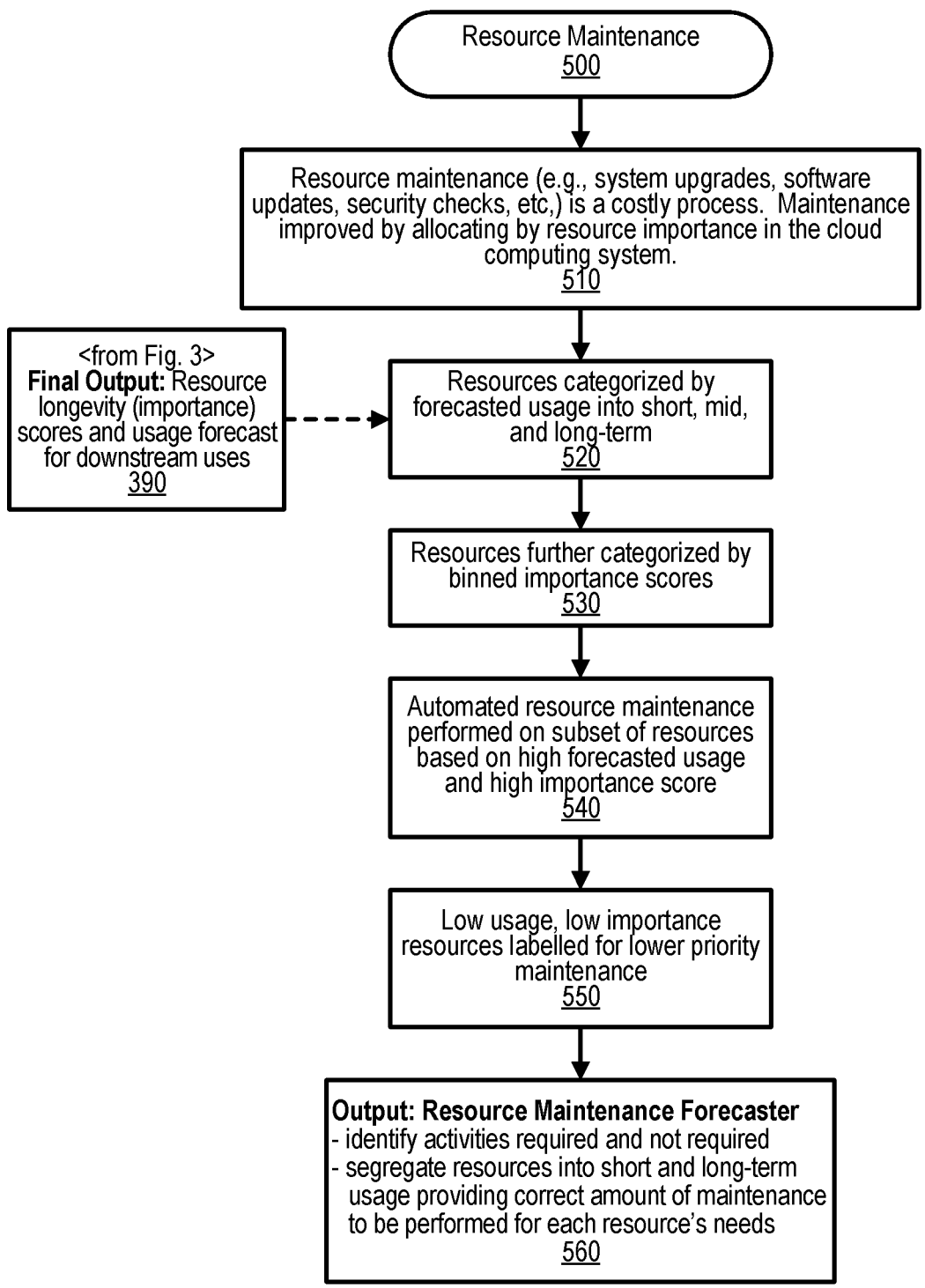
FIG. 5 is a flowchart depicting using resource longevity computed by FIG. 3 to generate a resource maintenance forecast.

FIG. 4 is a flowchart depicting using resource longevity computed by FIG. 3 to generate a cloud migration usage forecast. FIG. 5 processing commences at 500 and shows the steps taken by a process that performs a cloud migrations forecaster. At step 410, during a cloud migration, resources are moved in phases and some are destroyed permanently not to be moved at all. This process identifies the importance of resources and their longevity, therefore, creating more accurate cloud migration phases targeting the correct resources. At step 420, the process categorizes resource by their respective forecasted usage (e.g., short, mid, and long-term, etc.) given the final output data that was provided by the process shown in FIG. 3.

Returning to FIG. 4, at step 430, the process further categorizes the resources based on their respective binned importance scores. At step 440, the process sorts short-term resources by increasing importance and evaluates the resources based on the next anticipated action (e.g., migrate, destroy, etc.). At step 450, the process sorts low importance resource by increasing usage forecast and evaluates the resources for their next anticipated action (e.g., migrate, destroy, etc.). At step 460, the process creates the output of a Cloud Migration Usage Forecaster with the forecaster designed to decrease overall cloud computing costs. The forecaster also designs a cloud migration that predicts the costs of current and future systems.

FIG. 5 is a flowchart depicting using resource longevity computed by FIG. 3 to generate a resource maintenance forecast. FIG. 5 processing commences at 500 and shows the steps taken by a process that uses the resource longevity data computed by FIG. 3 to generate a resource maintenance forecast. At step 510, recognizes that resource maintenance (e.g., system upgrades, software updates, security checks, etc.,) is a costly process. Thus the process improves maintenance by allocating based on the resource importance in the cloud computing system. At step 520, the process categorizes resources by forecasted usage (e.g., into short, mid, and long-term, etc.) using the final output longevity data that was provided by the process shown in FIG. 3.

Returning to FIG. 5, at step 530, the process further categorizes resources based on their respective binned importance scores. At step 540, the process performs automated resource maintenance on a subset of the resources based on such resources having a high forecasted usage and a high importance score. At step 550, the process labels low usage, low importance resources for lower priority maintenance. At step 560, the process creates the output of a Resource Maintenance Forecaster with the forecaster designed to identify activities required and not required for resources. The forecaster also segregates resources into short and long-term usage providing correct amount of maintenance to be performed for each resource's needs.

Figure 6:
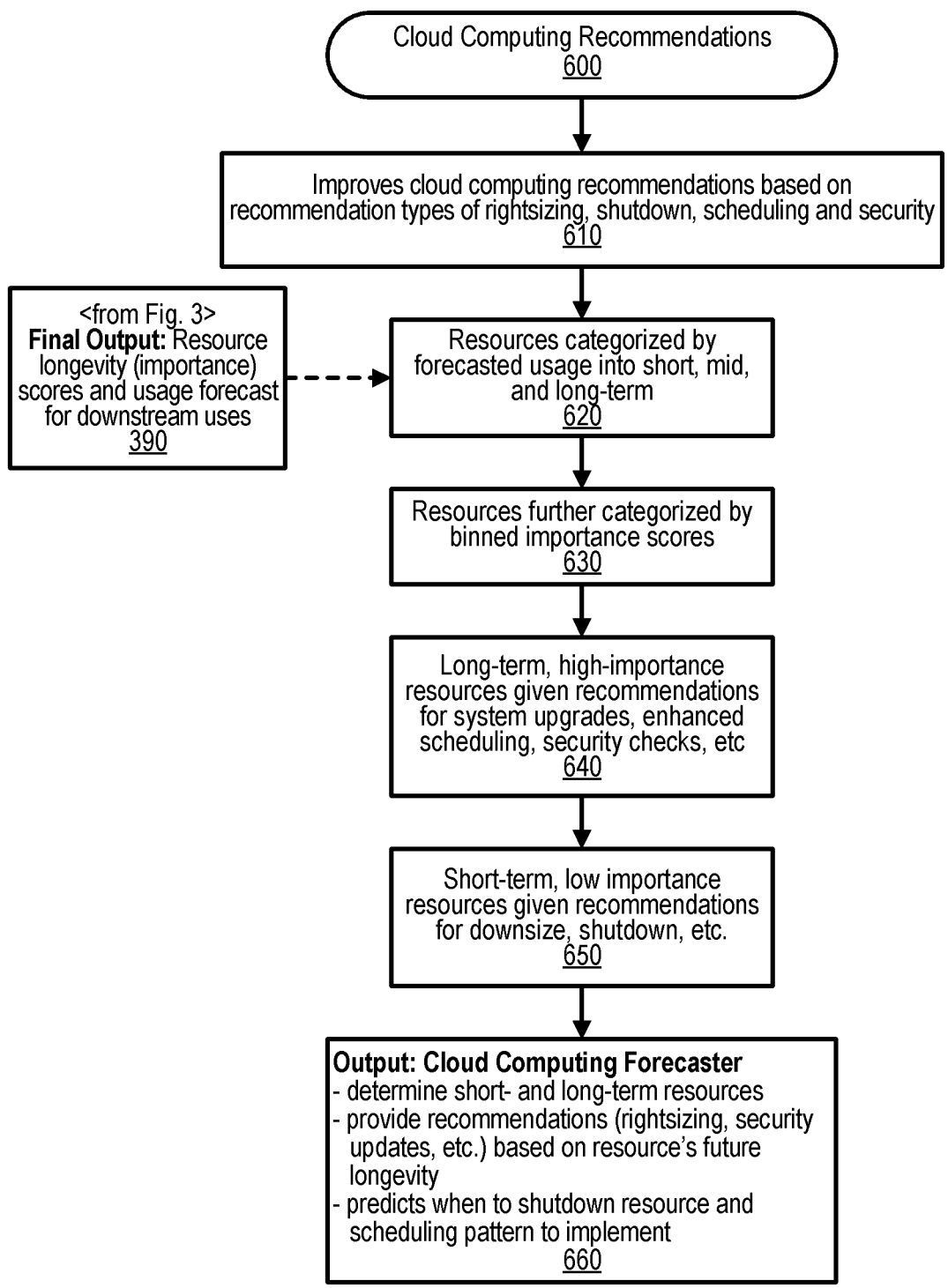
FIG. 6 is a flowchart depicting using resource longevity computed by FIG. 3 to generate a cloud computing forecast.

FIG. 6 is a flowchart depicting using resource longevity computed by FIG. 3 to generate a cloud computing forecast. FIG. 6 processing commences at 600 and shows the steps taken by a process that that uses the resource longevity data computed by FIG. 3 to generate a cloud computing resource forecast. At step 610, the process shown in FIG. 6 improves cloud computing recommendations based on recommendation types such as rightsizing, shutdown, scheduling and security. At step 620, the process categorizes resources based on forecasted usage into short, mid, and long-term with the forecast data being supplied by the final output from FIG. 3. At step 630, the process further categorizes resources based on the binned importance scores. At step 640, the process gives recommendations for long-term, high-importance resources for various system activities such as system upgrades, enhanced scheduling, security checks, etc. At step 650, the process provides recommendations for short-term, low importance resources such as downsize, shutdown, etc. At step 660, the process creates an output of a Cloud Computing Forecaster. The forecaster determines short-and long-term resources, provides recommendations (rightsizing, security updates, etc.) based on each resource's future longevity, and predicts when to shutdown resource and provides a scheduling pattern to implement.

Figure 7:
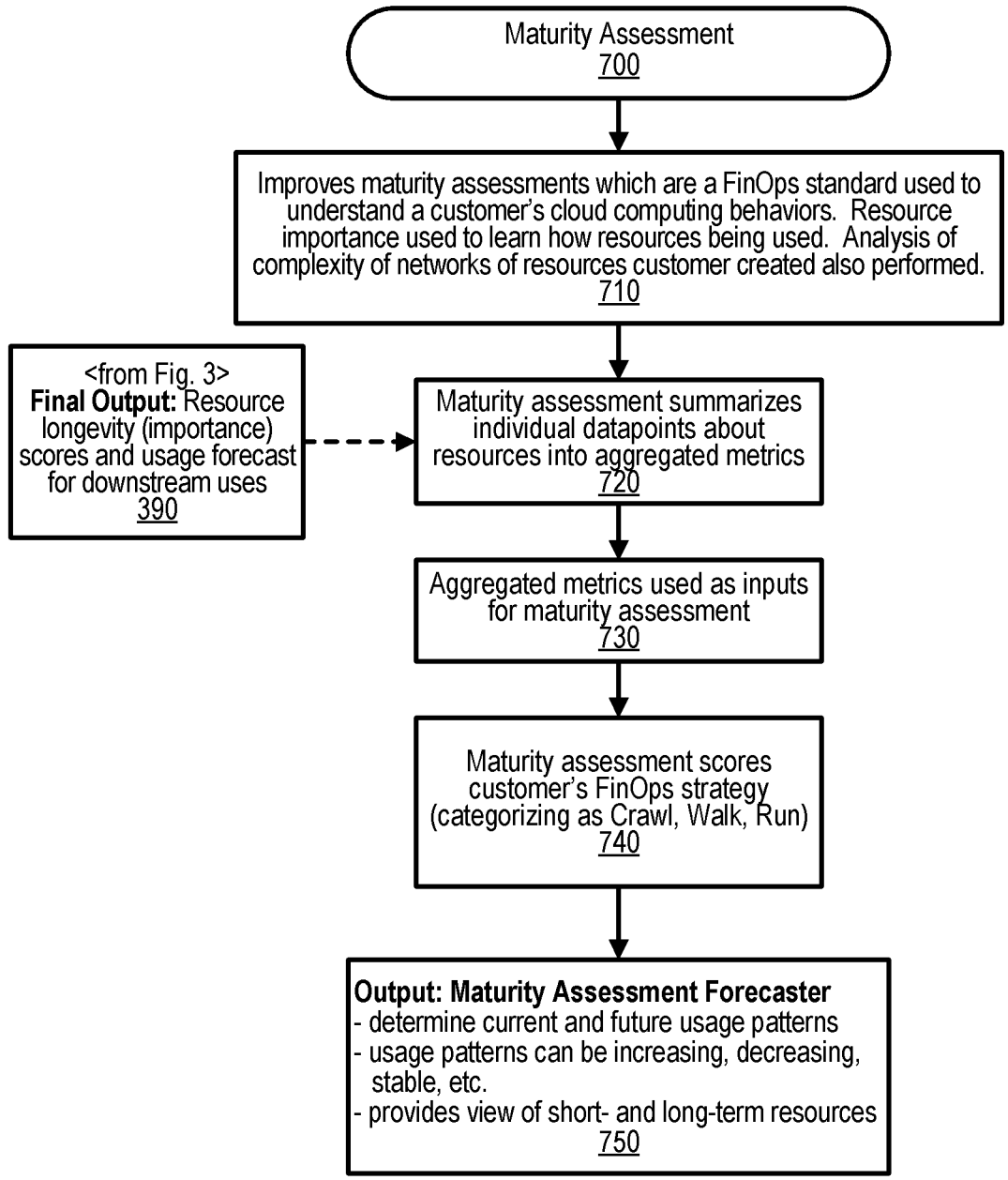
FIG. 7 is a flowchart depicting using resource longevity computed by FIG. 3 to generate a maturity assessment forecast.

FIG. 7 is a flowchart depicting using resource longevity computed by FIG. 3 to generate a maturity assessment forecast. FIG. 7 processing commences at 700 and shows the steps taken by a process that uses the resource longevity data from FIG. 3 to create a maturity assessment forecast. At step 710, the process shown in FIG. 7 improves the maturity assessments of resources. The maturity assessments are a FinOps (Financial Operations) standard that is used to understand a customer's cloud computing behaviors. Resource importance used to learn how resources being used. Analysis of complexity of networks of resources customer created also performed. At step 720, the process uses the longevity data from FIG. 3 to summarize individual datapoints about the resources into a set of aggregated metrics that are used in the maturity assessment. At step 730, the process aggregates the metrics used as inputs for maturity assessment. At step 740, the process scores the maturities assessment based on the customer's FinOps strategy (e.g., categorizing as Crawl, Walk, Run, etc.). At step 750, the process creates an output of a Maturity Assessment Forecaster. This forecaster determines the current and future usage patterns of resources. The usage patterns can be increasing, decreasing, stable, etc. The forecaster also provides a maturity assessment view of short-and long-term resources.

Figure 8:
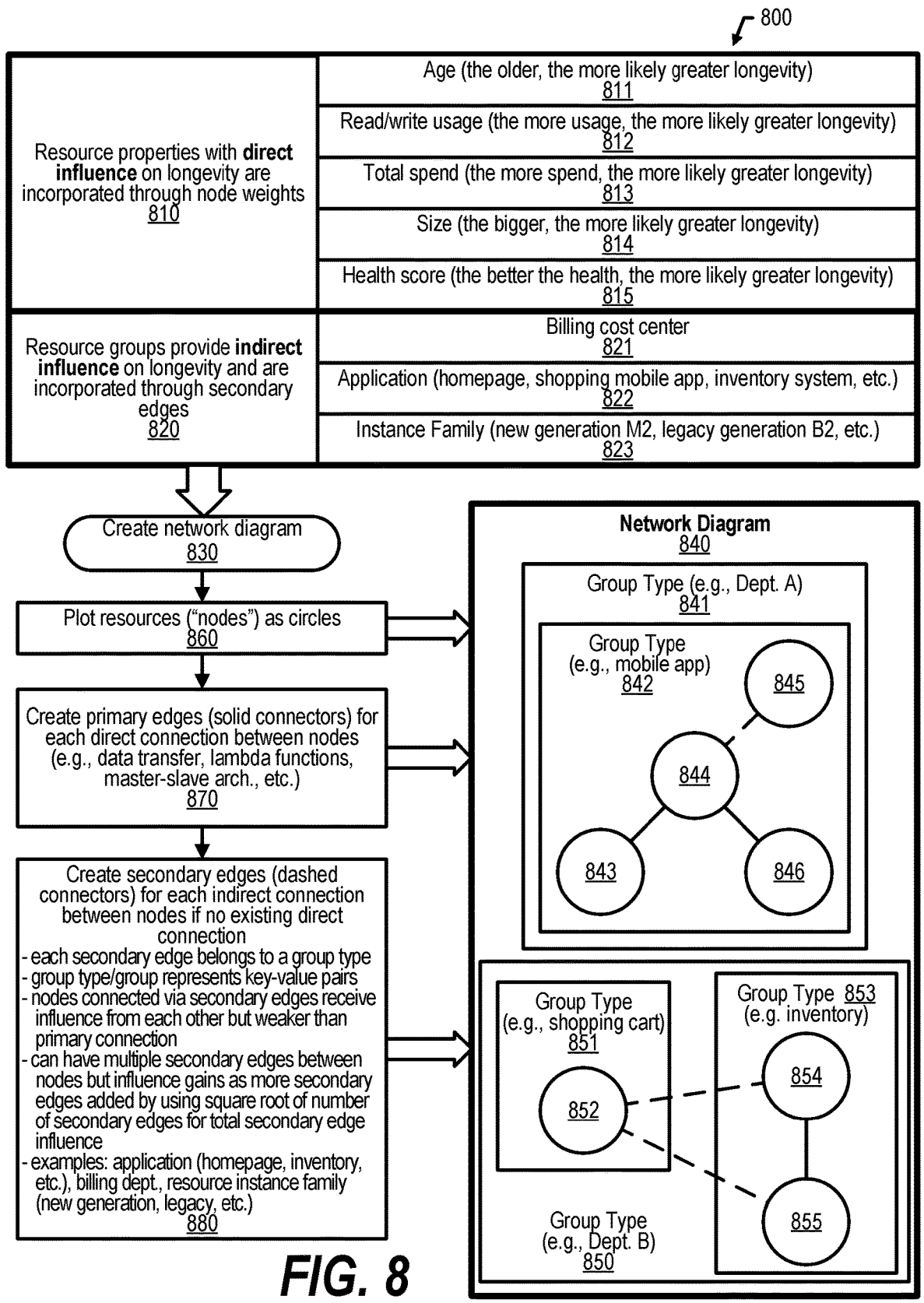
FIG. 8 is a diagram showing the creation of a network graph.

FIG. 8 is a diagram showing the creation of a network graph. Resource attributes and properties 800 are used to infer resource longevity. These are divided into those with a direct influence on longevity which are incorporated through node weight values (subset 810) and those that provide indirect influence (subset 820) which are incorporated through secondary edges between nodes. Examples of resource properties with direct influence on resource longevity (subset 810) include age 811, read/write usage 812, total spending on resource 813, size of resource 814, and health score of resource 815. Examples of resource groups that provide indirect influence on resource longevity (subset 820) include billing cost center 821, application 822, and instance family 823. Different and/or additional direct and indirect influences are based upon the type of organization and the type of resources in such organization.

A flowchart is shown commencing at 830 that creates network graph 840. The network graph can include many different group types with each group type containing nodes as well as other group types. Nodes, shown as circles in the network graph, represent the various resources. In the example shown, the network graph has two major group types noted as Department A (841) and Department B (850). The Department A group type is shown as having one group type within the department (group type 842, such as a mobile app). Group type 842 is shown as having four nodes (843, 844, 845, and 846). The solid lines between nodes 843 and 844 and between 844 and 846 note a direct connection, also called a "primary edge" between these nodes, as is further discussed below. The dashed line between node 844 and 845 notes an indirect connection, also called a "secondary edge" between these nodes, as is further discussed below. Turning to group type 850 (department B), two group types are shown being contained in this group type, group type 851 (such as an online shopping cart) and group type 853 (such as inventory). Group type 851 is shown with a single node (resource) 852, while group type 853 is shown with two nodes—854 and 855. A direct connection is shown between nodes 854 and 855 with indirect connections being shown between node 852 and 854 and between 852 and 855. Note that direct connections and indirect connections can connect nodes that are in two different group types. In one embodiment, the group type data for the nodes is included in the resource attribute data shown (see data store 320 in FIG. 3, attribute data 800, etc.).

Flowchart 830 is shown having three primary steps to create network graph 840. At step 860, the process plots the resources ("nodes") as circles in network graph 840. The plotted nodes can then be grouped into group type based on resource attribute data corresponding to the resources. At step 870, the process creates primary edges (solid connectors) for each direct connection between nodes. These direct connection could include data transfer between nodes, lambda functions between nodes, master-slave architecture relationship between nodes, and the like. At step 880, the process creates secondary edges (dashed connectors) for each indirect connection between nodes if there is no existing direct connection between such nodes. Each secondary edge belongs to a group type. A group type/group represents key-value pairs. Nodes that are connected via secondary edges receive influence from each other but this influence is weaker than the influence from a primary connection. There can be multiple secondary edges between nodes, however the influence gains are diminished as more secondary edges are added by using, in one embodiment, a square root of the number of secondary edges for the total secondary edge influence. Examples of secondary edges include application (homepage, inventory, etc.), billing dept., resource instance family (new generation, legacy, etc.), and the like.

Figure 9:
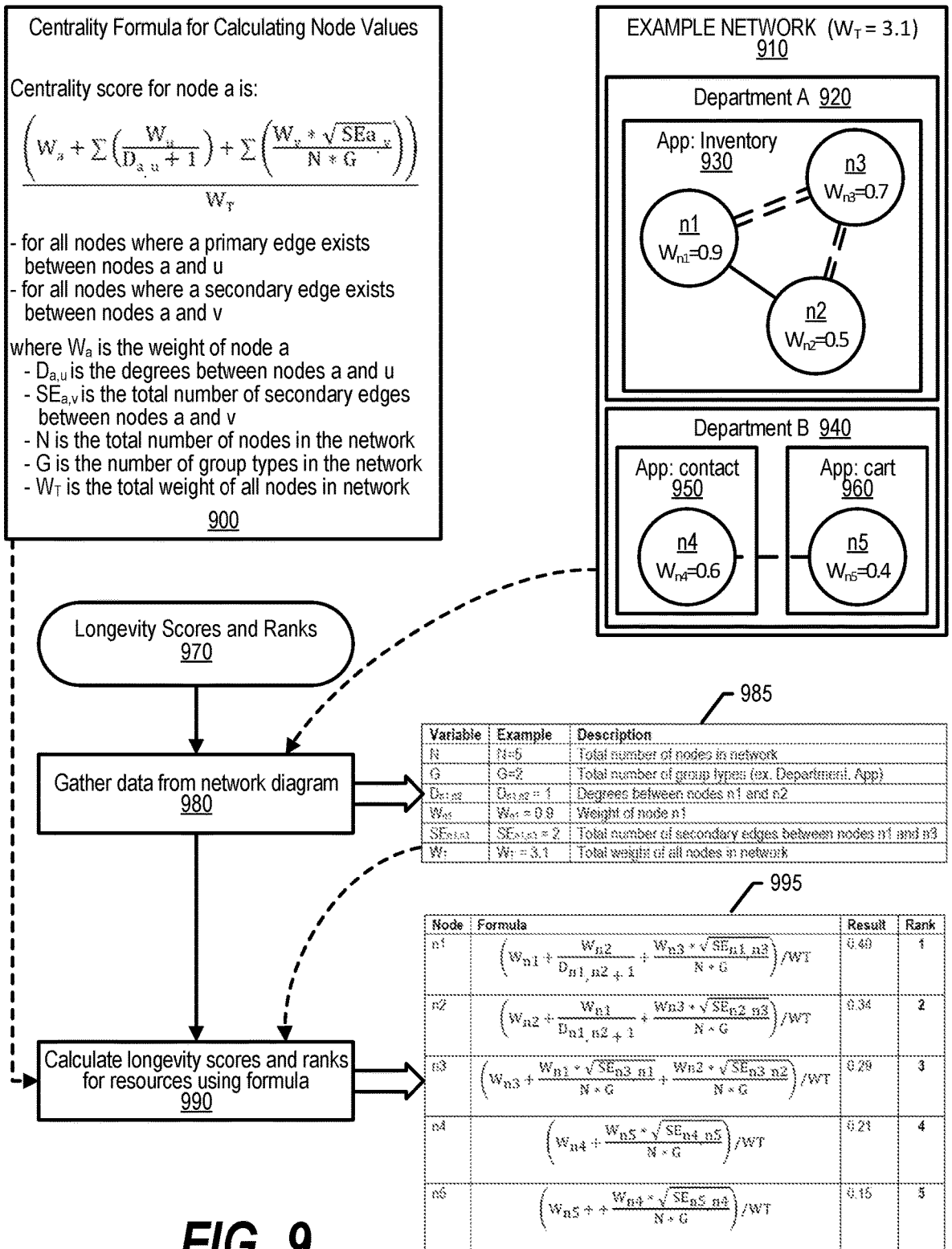
FIG. 9 is a diagram showing calculations of longevity scores for resources using a centrality formula and the ranking of resources.

FIG. 9 is a diagram showing calculations of longevity scores for resources using a centrality formula and the ranking of resources. A centrality formula for calculating node values is shown in box 900. One embodiment of a formula used to compute a centrality score for node "a" is shown in box 900 for all nodes where a primary edge exists between nodes "a" and "u" and for all nodes where a secondary edge exists between nodes "a" and "v". In the formula, $W_a$ is the weight of node "a", $D_{a,u}$ is the degrees between nodes "a" and "u", $SE_{a,v}$ is the total number of secondary edges between nodes "a" and "v", N is the total number of nodes in the network, G is the number of group types in the network, and $W_T$ is the total weight of all nodes in network.

An example network graph 910 is shown with weight values with the total weight of all nodes ($W_T$) being 3.1. Group type Department A 920 includes an inventory app 930 that has three nodes (n1, n2, and n3) with their weight scores being 0.9, 0.5, and 0.7, respectively. A direct connection is shown between n1 and n2, a single secondary connection is shown between n1 and n3, and two secondary connections are shown between n2 and n3. Group type Department B 940 includes two group types (app: contact 950 and app: cart 960) with the contact group having one node (n4) with a weight of 0.6 and the cart group also having one node (n5) but with a weight of 0.4.

Flowchart 970 calculates node (resource) longevity and ranks. This is performed by first gathering data from network graph 910 at step 980. The data gathered is depicted in table 985. Next, at step 990, the process calculates the longevity scores and ranks for the resources using the formula depicted in box 900 with the formula taking gathered inputs stored in table 985 to execute the centrality formula for each node. The results and ranks for each node are shown in table 995 that depicts each node, the formula (with values) used to calculate the node values, the result of the formula, and the rank of the node with respect to the other nodes.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by a processor coupled to a memory, comprising:
   creating a network graph that identifies a plurality of computing resources as nodes, wherein each of the computing resources is weighted based upon the corresponding resource's attributes and usage;
   connecting first one or more pluralities of nodes as directly connected and a second one or more pluralities of nodes as indirectly connected;
   calculating a plurality of node longevity values, each of the node longevity values corresponding to one node of the plurality of nodes in the network graph, wherein the calculating is based on the direct and indirect connections between each of the plurality of nodes, wherein the calculating of a node longevity value for the one node of the plurality of nodes is based on factors comprising an age, a read/write usage, a size, and a health score of the one node of the plurality of nodes; and
   automatically migrating the computer resources in phases in accordance with the plurality of node longevity values such that some of the computer resources are not migrated thereby managing the computing resources based on the corresponding node longevity values, wherein the managing further comprises performing system upgrades, software updates, or security checks based on a set of short-term resources.

2. The method of claim 1 further comprising:
   identifying an amount of longevity influence corresponding to each of the resource attributes and usages, wherein the weight is based on the identified amount of longevity influence.

3. The method of claim 1 further comprising:
   identifying a total number of indirect connections between a first node and a second node, wherein the calculating of the longevity values uses a square root of the total number of indirect connections.

4. The method of claim 1, wherein the managing is a management of a cloud migration activity, wherein the method further comprises:
   categorizing the plurality of resources based on their corresponding node longevity values;
   identifying a set of short-term resources based on the categorizing, wherein the set of short-term resources are evaluated based on a next action recommended for each of the short-term resources;
   identifying a set of low-importance resources based on a usage forecast, wherein the set of low-importance resources are evaluated based on a next action recommended for each of the low-importance resources, wherein at least one of the low-importance resources is recommended to be destroyed; and
   generating a cloud migration usage forecast based on the resource longevity values, the identified set of short-term resources, and the identified set of low-importance resources.

5. The method of claim 1, wherein the managing is a cloud computing recommendation, wherein the method further comprises:
   categorizing the plurality of resources based on their corresponding node longevity values;
   identifying a set of high-importance resources based on the categorizing, and a set of recommendations corresponding resources;
   identifying a plurality of short-term resources and a plurality of long-term resources based on the resource's respective node longevity values;
   recommending a cloud computing action corresponding to the plurality of short-term resources;
   generating a cloud computing forecast based on the resource longevity values, the cloud computing forecast providing recommendations corresponding to the computing resources based on the corresponding resource's longevity value and a prediction on a time to shutdown one or more of the computing resources.

6. The method of claim 1, wherein the managing is a resource maintenance recommendation, wherein the method further comprises:
   categorizing the plurality of resources based on their corresponding node longevity values;
   identifying a high value set of resources that are of high-importance based on higher longevity values and based on high usage values, wherein the high value set of resources are scheduled for automated resource maintenance; and
   identifying a low value set of resources that are of low-importance based on lower longevity values and based on low usage values, wherein the low value set of resources are scheduled for low priority maintenance.

7. The method of claim 1, wherein the managing is a maturity assessment, wherein the method further comprises:

summarizing a plurality of datapoints corresponding to the plurality of resources into a plurality of aggregated metrics;

inputting the aggregated metrics into an artificial intelligence (AI) model trained to understand maturity assessment based on a financial operations (FinOps) standard;

receiving a set of maturity assessment scores from the trained AI model, wherein the maturity assessment scores include a current usage pattern corresponding to the plurality of resources and a future usage pattern corresponding to the plurality of resources; and creating a maturity assessment forecast, wherein the maturity assessment forecast is based on the set of maturity assessment scores.

8. The method of claim 1, wherein:

the node longevity value increases as the age increases;

the node longevity value increases as the read/write usage increases;

the node longevity value increases as the size increases; and the node longevity value increases as the health score increases.

9. An information handling system comprising:

one or more processors;

a memory coupled to at least one of the processors; and a set of instructions stored in the memory and executed by at least one of the processors to perform actions comprising:

creating a network graph that identifies a plurality of computing resources as nodes, wherein each of the computing resources is weighted based upon the corresponding resource's attributes and usage;

connecting first one or more pluralities of nodes as directly connected and a second one or more pluralities of nodes as indirectly connected;

calculating a plurality of node longevity values, each of the node longevity values corresponding to one node of the plurality of nodes in the network graph, wherein the calculating is based on the direct and indirect connections between each of the plurality of nodes, wherein the calculating of a node longevity value for the one node of the plurality of nodes is based on factors comprising an age, a read/write usage, a size, and a health score of the one node of the plurality of nodes; and automatically migrating the computer resources in phases in accordance with the plurality of node longevity values such that some of the computer resources are not migrated thereby managing the computing resources based on the corresponding node longevity values, wherein the managing further comprises performing system upgrades, software updates, or security checks based on a set of short-term resources.

10. The information handling system of claim 9 wherein the actions further comprise:

identifying an amount of longevity influence corresponding to each of the resource attributes and usages, wherein the weight is based on the identified amount of longevity influence.

11. The information handling system of claim 9 wherein the actions further comprise:

identifying a total number of indirect connections between a first node and a second node, wherein the calculating of the longevity values uses a square root of the total number of indirect connections.

12. The information handling system of claim 9, wherein the managing is a management of a cloud migration activity, wherein the actions further comprise:

categorizing the plurality of resources based on their corresponding node longevity values;

identifying a set of short-term resources based on the categorizing, wherein the set of short-term resources are evaluated based on a next action recommended for each of the short-term resources;

identifying a set of low-importance resources based on a usage forecast, wherein the set of low-importance resources are evaluated based on a next action recommended for each of the low-importance resources, wherein at least one of the low-importance resources is recommended to be destroyed; and generating a cloud migration usage forecast based on the resource longevity values, the identified set of short-term resources, and the identified set of low-importance resources.

13. The information handling system of claim 9, wherein the managing is a cloud computing recommendation, wherein the actions further comprise:

categorizing the plurality of resources based on their corresponding node longevity values;

identifying a set of high-importance resources based on the categorizing, and a set of recommendations corresponding resources;

identifying a plurality of short-term resources and a plurality of long-term resources based on the resource's respective node longevity values;

recommending a cloud computing action corresponding to the plurality of short-term resources;

generating a cloud computing forecast based on the resource longevity values, the cloud computing forecast providing recommendations corresponding to the computing resources based on the corresponding resource's longevity value and a prediction on a time to shutdown one or more of the computing resources.

14. The information handling system of claim 9, wherein the managing is a resource maintenance recommendation, wherein the actions further comprise:

categorizing the plurality of resources based on their corresponding node longevity values;

identifying a high value set of resources that are of high-importance based on higher longevity values and based on high usage values, wherein the high value set of resources are scheduled for automated resource maintenance; and identifying a low value set of resources that are of low-importance based on lower longevity values and based on low usage values, wherein the low value set of resources are scheduled for low priority maintenance.

15. The information handling system of claim 9, wherein the managing is a maturity assessment, wherein the actions further comprise:

summarizing a plurality of datapoints corresponding to the plurality of resources into a plurality of aggregated metrics;

inputting the aggregated metrics into an artificial intelligence (AI) model trained to understand maturity assessment based on a financial operations (FinOps) standard;

receiving a set of maturity assessment scores from the trained AI model, wherein the maturity assessment scores include a current usage pattern corresponding to the plurality of resources and a future usage pattern corresponding to the plurality of resources; and creating a maturity assessment forecast, wherein the maturity assessment forecast is based on the set of maturity assessment scores.

16. A computer program product comprising:
a non-transitory computer readable storage medium comprising a set of computer instructions that, when executed by a processor, are effective to perform actions comprising:
creating a network graph that identifies a plurality of computing resources as nodes, wherein each of the computing resources is weighted based upon the corresponding resource's attributes and usage;
connecting first one or more pluralities of nodes as directly connected and a second one or more pluralities of nodes as indirectly connected;
calculating a plurality of node longevity values, each of the node longevity values corresponding to one node of the plurality of nodes in the network graph, wherein the calculating is based on the direct and indirect connections between each of the plurality of nodes, wherein the calculating of a node longevity value for the one node of the plurality of nodes is based on factors comprising an age, a read/write usage, a size, and a health score of the one node of the plurality of nodes, wherein the calculating of the longevity values uses a square root of the indirect connections; and
automatically migrating the computer resources in phases in accordance with the plurality of node longevity values such that some of the computer resources are not migrated thereby managing computing resources based on the corresponding node longevity values, wherein the managing further comprises performing system upgrades, software updates, or security checks based on a set of short-term resources.

17. The computer program product of claim 16 wherein the actions further comprise:
identifying an amount of longevity influence corresponding to each of the resource attributes and usages, wherein the weight is based on the identified amount of longevity influence.

18. The computer program product of claim 16, wherein the managing is a management of a cloud migration activity, wherein the actions further comprise:
categorizing the plurality of resources based on their corresponding node longevity values;
identifying the set of short-term resources based on the categorizing, wherein the set of short-term resources are evaluated based on a next action recommended for each of the short-term resources;
identifying a set of low-importance resources based on a usage forecast, wherein the set of low-importance resources are evaluated based on a next action recommended for each of the low-importance resources, wherein at least one of the low-importance resources is recommended to be destroyed; and
generating a cloud migration usage forecast based on the resource longevity values, the identified set of short-term resources, and the identified set of low-importance resources.

19. The computer program product of claim 16, wherein the managing is a cloud computing recommendation, wherein the actions further comprise:
categorizing the plurality of resources based on their corresponding node longevity values;
identifying a set of high-importance resources based on the categorizing, and a set of recommendations corresponding resources;
identifying a plurality of short-term resources and a plurality of long-term resources based on the resource's respective node longevity values;
recommending a cloud computing action corresponding to the plurality of short-term resources;
generating a cloud computing forecast based on the resource longevity values, the cloud computing forecast providing recommendations corresponding to the computing resources based on the corresponding resource's longevity value and a prediction on a time to shutdown one or more of the computing resources.

20. The computer program product of claim 16, wherein the managing is a resource maintenance recommendation, wherein the actions further comprise:
categorizing the plurality of resources based on their corresponding node longevity values;
identifying a high value set of resources that are of high-importance based on higher longevity values and based on high usage values, wherein the high value set of resources are scheduled for automated resource maintenance; and
identifying a low value set of resources that are of low-importance based on lower longevity values and based on low usage values, wherein the low value set of resources are scheduled for low priority maintenance.

* * * * *